US012681766B2

(12) United States Patent
Patel et al.

(10) Patent No.: US 12,681,766 B2
(45) Date of Patent: Jul. 14, 2026

(54) IHS (INFORMATION HANDLING SYSTEM) MESH ARCHITECTURE FOR CIRCUIT OPTIMIZATION

(71) Applicant: Dell Products, L.P., Round Rock, TX (US)

(72) Inventors: Bhavesh Govindbhai Patel, Austin, TX (US); Arun Chada, Pflugerville, TX (US); Bhyrav M. Mutnury, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 991 days.

(21) Appl. No.: 17/814,310

(22) Filed: Jul. 22, 2022

(65) Prior Publication Data

US 2024/0028406 A1    Jan. 25, 2024

(51) Int. Cl.
*G06F 9/50* (2006.01)

(52) U.S. Cl.
CPC .......... *G06F 9/5044* (2013.01); *G06F 9/5077* (2013.01)

(58) Field of Classification Search
CPC ............................. G06F 9/5044; G06F 9/5077
See application file for complete search history.

(56) References Cited

U.S. PATENT DOCUMENTS

| | | | |
|---|---|---|---|
| 8,136,080 B2 * | 3/2012 | Shulmister, Jr. | ........ H04L 43/50 |
| | | | 716/136 |
| 2013/0318194 A1 * | 11/2013 | Timbs | ................... G06F 16/172 |
| | | | 709/213 |

* cited by examiner

*Primary Examiner* — April Y Blair
(74) *Attorney, Agent, or Firm* — Fogarty LLP

(57) ABSTRACT

Systems and methods provide circuit optimizations using a mech architecture of an IHS (Information Handling System). A control block operated by a CPU of the IHS determines availability of mesh resources, including resources of a removeable processor of the IHS. The control block reserves available resources of the removeable processor for use in a circuit optimization. The control block assigns a portion of the circuit optimization to the removeable processor. A mesh client operated by the replaceable processor calculates a result by processing the assigned portion of the circuit optimization. The mesh client also tracks the use of resource of the removeable processor during the calculation of the assigned portion of the circuit optimization. The results of the calculation and a log specifying the tracked use of the resources of the removeable processor are transmitted to the control block to determine updates to the mesh resources that are reserved.

20 Claims, 4 Drawing Sheets

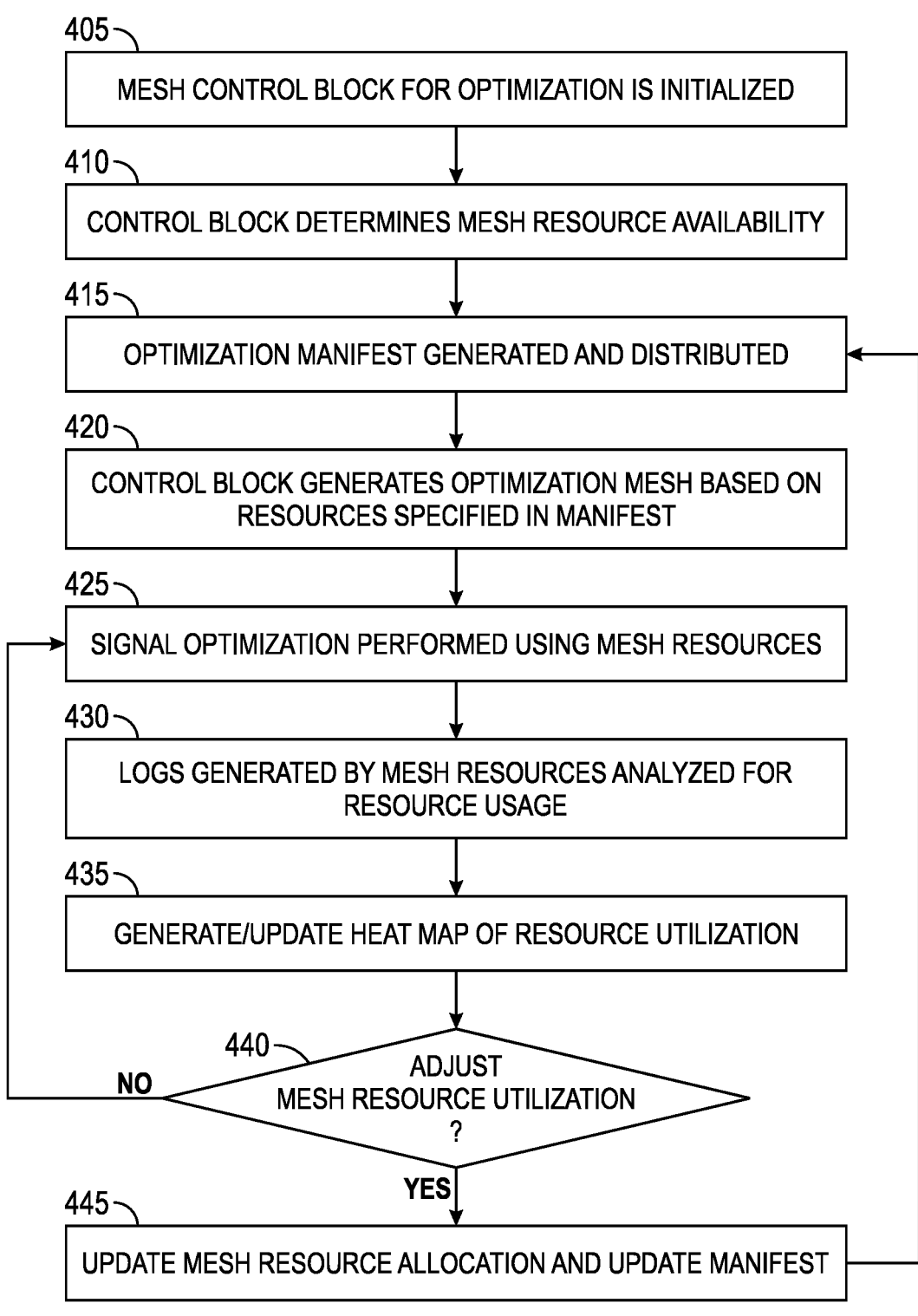

405 ～
MESH CONTROL BLOCK FOR OPTIMIZATION IS INITIALIZED

410 ～
CONTROL BLOCK DETERMINES MESH RESOURCE AVAILABILITY

415 ～
OPTIMIZATION MANIFEST GENERATED AND DISTRIBUTED

420 ～
CONTROL BLOCK GENERATES OPTIMIZATION MESH BASED ON RESOURCES SPECIFIED IN MANIFEST

425 ～
SIGNAL OPTIMIZATION PERFORMED USING MESH RESOURCES

430 ～
LOGS GENERATED BY MESH RESOURCES ANALYZED FOR RESOURCE USAGE

435 ～
GENERATE/UPDATE HEAT MAP OF RESOURCE UTILIZATION

440 ～
ADJUST MESH RESOURCE UTILIZATION ?

NO

YES

445 ～
UPDATE MESH RESOURCE ALLOCATION AND UPDATE MANIFEST

FIG. 4

IHS (INFORMATION HANDLING SYSTEM) MESH ARCHITECTURE FOR CIRCUIT OPTIMIZATION

FIELD

The present disclosure relates generally to Information Handling Systems (IHSs), and relates more particularly to a hardware architecture for use in improving the efficiency of communication circuits of an IHS.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

An IHS may include one or more printed circuit boards (PCBs). A variety of electrical hardware components may be mechanically coupled to a PCB of an IHS. These hardware components coupled to a PCB may include variety of replaceable and non-replaceable components that are electrically coupled to various circuit pathways provided by the PCB. Within a single IHS, PCBs may be utilized within a variety of devices and systems. For instance, PCBs may be used to construct motherboards, backplanes, midplanes, microcontrollers, memory cards, storage devices, peripherals cards (e.g., network interface cards, graphics processor cards) and a wide variety of other electronic components.

A PCB is typically constructed using multiple alternating layers of conductive and insulating materials that are laminated together. The conductive layers of the PCB may be referred to as trace layers and the circuit pathways formed within a conductive layer may be referred to as a trace. Components that are mechanically connected to the PCB may be electrically connected to other components that are connected to the PCB via signaling pathways that are formed from the trace layers, while the alternating resin layers isolate the trace layers from each other and from external sources of signal degradation.

In order to connect trace layers to each other and to the components mechanically coupled to the surface of the PCB, vias may be drilled in the PCB at locations where the traces in different trace layers overlap. The vias may then be filled with a conductive material to connect the circuit pathways in different trace layers. During manufacture of a PCB, each via is formed by drilling a hole through the layers of the PCB, or partially through the PCB, at locations at which the drilled hole intersects with the trace layers to be connected by the via. The entire length of the drilled hole is then filled or coated with a conductive material, thus completing the signal pathway between the layers.

For some IHSs, PCB stack ups may be over 20 layers deep. In such a signaling environment, circuits are difficult to optimize, especially since minor differences in the dimension of any PCB feature can result in significant differences with regard to the efficiency of the feature. Changing the size of any feature can have significant effects on impedances and losses. For instance, a change in any dimension of the vias in the PCB stack up can result in significant changes in impedances within the via and within circuits connecting to the via, and potentially within nearby circuits that are not connected to the via. Search spaces for identifying optimal PCB designs from within the universe of available design choices are immense in size.

SUMMARY

In various embodiments, IHSs (Information Handling Systems) may include: one or more CPUs; one or more memory devices storing computer-readable instructions that, upon execution by the one or more CPUs, cause a mesh control block program to: determine availability of one or more mesh resources, wherein available mesh resources comprise resources of a first removeable processor of the IHS; reserve available resources of the first removeable processor for use in a circuit optimization; assign a portion of the circuit optimization to the first removeable processor; collect results from the first removeable processor for the assigned portion of the circuit optimization; collect a log specifying utilization levels of the reserved resources of the first removeable processor in calculating the assigned portion of the circuit optimization; and evaluate the log to determine updates to the mesh resources that are reserved for further use in the circuit optimization; and a plurality of removeable processors, each comprising: one or more processor cores; one or more memory devices storing computer-readable instructions that, upon execution by the processor cores, cause a mesh client program to: calculate the results by processing the portion of the circuit optimization assigned by the mesh control block; track use of resource of the first removeable processor during the calculation of the assigned portion of the circuit optimization; and transmit, to the mesh control block, the results of the calculation of the assigned portion of the circuit optimization and the log specifying the tracked use of the resources of the first removeable processor.

In some IHS embodiments, execution of the instructions by the one or more CPUs further causes the mesh control block program to generate a manifest specifying the available mesh resources of the first removeable processor to be reserved for use in the circuit optimization. In some IHS embodiments, execution of the instructions by the one or more CPUs further causes the mesh control block program to transmit to the first removeable processor, the manifest specifying the mesh resources of the first removeable processor to be reserved for use in the circuit optimization. In some IHS embodiments, execution of the instructions by the one or more removeable processor cores further causes the mesh client program to allocate the mesh resources of the first removeable processor specified in the manifest for exclusive use by the mesh client program. In some IHS embodiments, the removeable processors comprise at least one of a GPU (Graphics Processing Unit) and a DPU (Data Processing Unit). In some IHS embodiments, execution of the instructions by the one or more removeable processor cores further causes the mesh client program to update the availability of the mesh resources of the first removeable processor that are available for assignment by the mesh control block. In some IHS embodiments, the circuit optimization comprises a plurality of impedance calculations. In some IHS embodiments, the portion of the circuit optimization assigned to the first removeable processor comprises one or more of the impedance calculations for a first set of frequencies. In some IHS embodiments, the portion of the circuit optimization assigned to a second removeable processor comprises calculation of one or more of the impedance calculations at a second set of signaling frequencies. In some IHS embodiments, assigning the calculation of impedance calculations at the second set of signaling frequencies increases the fidelity of the circuit optimization. Some IHS embodiments may further include a remote access controller configured to collect information specifying the availability of the one or more mesh resources. In some IHS embodiments, information specifying the availability of the one or more mesh resources is collected using sideband management connections between the remote access controller and the one or more mesh resources.

In various additional embodiments, methods are provided for circuit optimization using a mech architecture of an IHS (Information Handling System). The methods may include: determining, by a mesh control block operated by a CPU of the IHS, availability of one or more mesh resources, wherein available mesh resources comprise resources of a first removeable processor of the IHS; reserving, by the mesh control block, available resources of the first removeable processor for use in a circuit optimization; assigning, by the mesh control block, a portion of the circuit optimization to the first removeable processor; calculating, by a mesh client operated by a replaceable processor of the IHS, the results by processing the portion of the circuit optimization assigned by the mesh control block; tracking, by the mesh client, use of resource of the first removeable processor during the calculation of the assigned portion of the circuit optimization; transmitting, by the mesh client to the mesh control block, the results of the calculation of the assigned portion of the circuit optimization and the log specifying the tracked use of the resources of the first removeable processor; collecting, by the mesh control block, a log specifying utilization levels of the reserved resources of the first removeable processor in calculating the assigned portion of the circuit optimization; and evaluating, by the mesh control block, the log to determine updates to the mesh resources that are reserved for further use in the circuit optimization.

In some method embodiments, the removeable processors comprise at least one of a GPU (Graphics Processing Unit) and a DPU (Data Processing Unit). Some method embodiments may further include, updating, by the mesh client, the availability of the mesh resources of the first removeable processor that are available for assignment by the mesh control block. In some method embodiments, the circuit optimization comprises a plurality of impedance calculations. In some method embodiments, the portion of the circuit optimization assigned to the first removeable processor comprises one or more of the impedance calculations at a first set of frequencies.

In various additional embodiments, systems may include: one or more CPUs (Central Processing Units) coupled to one or more memory devices storing computer-readable instructions that, upon execution by the one or more CPUs, cause a mesh control block program to: determine availability of one or more mesh resources, wherein available mesh resources comprise resources of a first removeable processor; reserve available resources of the first removeable processor for use in a circuit optimization; assign a portion of the circuit optimization to the first removeable processor; collect results from the first removeable processor for the assigned portion of the circuit optimization; collect a log specifying utilization levels of the reserved resources of the first removeable processor in calculating the assigned portion of the circuit optimization; and evaluate the log to determine updates to the mesh resources that are reserved for further use in the circuit optimization. The systems may further include a plurality of removeable processors, each comprising one or more processor cores and one or more memory devices storing computer-readable instructions that, upon execution by the processor cores, cause a mesh client program to: calculate the results by processing the portion of the circuit optimization assigned by the mesh control block; track use of resource of the first removeable processor during the calculation of the assigned portion of the circuit optimization; and transmit, to the mesh control block, the results of the calculation of the assigned portion of the circuit optimization and the log specifying the tracked use of the resources of the first removeable processor.

In some system embodiments, the removeable processors comprise at least one of a GPU (Graphics Processing Unit) and a DPU (Data Processing Unit). In some system embodiments, the circuit optimization comprises a plurality of impedance calculations.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

FIG. 4 is a flowchart describing certain steps of a method for use of a hardware architecture, according to some embodiments, for optimizing PCB circuits utilized in IHSs.

DETAILED DESCRIPTION

Figure 1:
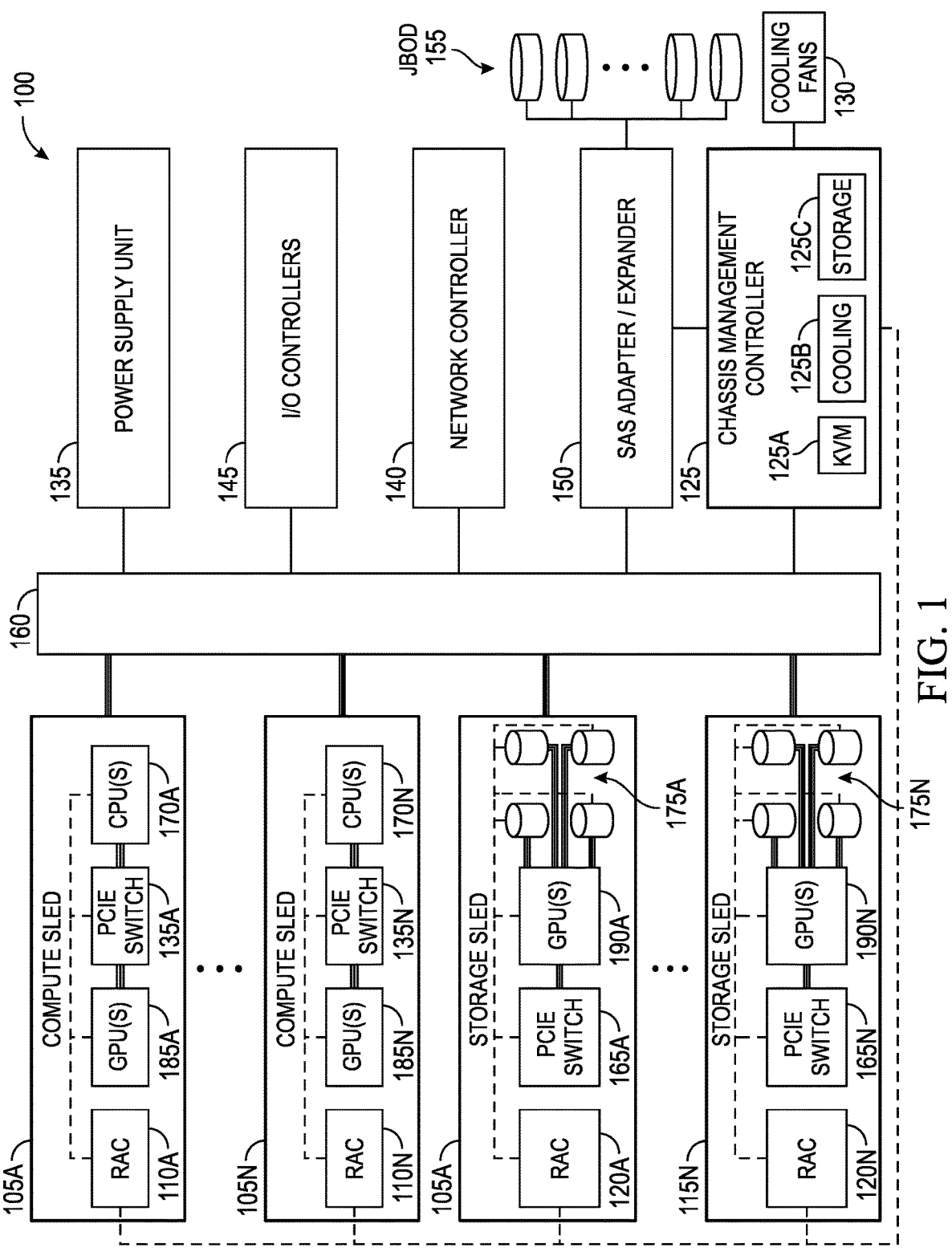
FIG. 1 is a diagram illustrating certain components of a chassis configured, according to some embodiments, for implementing a hardware architecture for optimizing PCB circuits utilized in the chassis.

FIG. 1 is a block diagram illustrating certain components of a chassis 100 comprising one or more compute sleds 105*a-n* and one or more storage sleds 115*a-n* that may be configured to implement a hardware architecture for optimizing signal integrity within communication circuits utilized in the chassis 100. Embodiments of chassis 100 may include a wide variety of hardware configurations in which one or more IHS 105*a-n*, 115*a-n* are installed in chassis 100. Such variations in hardware configuration may result from chassis 100 being factory assembled to include components specified by a customer that has contracted for manufacture and delivery of chassis 100. Upon delivery and deployment of a chassis 100, the chassis 100 may be modified by replacing and/or adding various hardware components, in addition to replacement of the removeable IHSs 105a-n, 115a-n that are installed in the chassis.

Chassis 100 may include one or more bays that each receive an individual sled (that may be additionally or alternatively referred to as a tray, blade, and/or node) IHSs, such as compute sleds 105a-n and storage sleds 115a-n. Chassis 100 may support a variety of different numbers (e.g., 4, 8, 16, 32), sizes (e.g., single-width, double-width) and physical configurations of bays. Embodiments may include additional types of sleds that provide various storage, power and/or processing capabilities. For instance, sleds installable in chassis 100 may be dedicated to providing power management or networking functions. Sleds may be individually installed and removed from the chassis 100, thus allowing the computing and storage capabilities of a chassis to be reconfigured by swapping the sleds with different types of sleds, in many cases at runtime without disrupting the ongoing operations of the other sleds installed in the chassis 100.

Multiple chassis 100 may be housed within a rack. Data centers may utilize large numbers of racks, with various different types of chassis installed in various configurations of racks. The modular architecture provided by the sleds, chassis and racks allow for certain resources, such as cooling, power and network bandwidth, to be shared by the compute sleds 105a-n and storage sleds 115a-n, thus providing efficiency improvements and supporting greater computational loads. For instance, certain computational tasks, such as some computational tasks utilized in embodiments described herein, may utilize computational and/or storage resources that are shared within an IHS, within a chassis 100 and/or within a set of IHSs that may be spread across multiple chassis of a data center.

Chassis 100 may be installed within a rack structure that provides at least a portion of the cooling utilized by the Hs 105a-n, 115a-n installed in chassis 100. For airflow cooling, a rack may include one or more banks of cooling fans that may be operated to ventilate heated air from within the chassis 100 that is housed within the rack. The chassis 100 may alternatively or additionally include one or more cooling fans 130 that may be similarly operated to ventilate heated air away from sleds 105a-n, 115a-n installed within the chassis. In this manner, a rack and a chassis 100 installed within the rack may utilize various configurations and combinations of cooling fans to cool the sleds 105a-n, 115a-n and other components housed within chassis 100.

The sleds 105a-n, 115a-n may be individually coupled to chassis 100 via connectors that correspond to the bays provided by the chassis 100 and that physically and electrically couple an individual sled to a backplane 160. Chassis backplane 160 may be a printed circuit board that includes electrical traces and connectors that are configured to route signals between the various components of chassis 100 that are connected to the backplane 160. In the illustrated embodiment, the connectors for use in coupling sleds 105a-n, 115a-n to backplane 160 include PCIe couplings that support high-speed data links with the sleds 105a-n, 115a-n. In various embodiments, backplane 160 may include various additional components, such as cables, wires, midplanes, backplanes, connectors, expansion slots, and multiplexers. In certain embodiments, backplane 160 may be a motherboard that includes various electronic components installed thereon. Such components installed on a motherboard backplane 160 may include components that implement all or part of the functions described with regard to the SAS (Serial Attached SCSI) expander 150, I/O controllers 145, network controller 140 and power supply unit 135.

In supporting increasingly dense arrangements of components within an IHS 105a-n, 115a-n and/or chassis 100, the printed circuit boards that are utilized within a chassis, such as in the backplane, may be incredibly complex. Due to such complexity, a wide range of signal integrity degradations may be observed within such printed circuit boards. Identifying and eliminating sources of signal degradation is complicated by the great number of design options that are viable solutions capable of allowing the components on the motherboard to be effectively powered and coupled to other components, even if the viable solutions are largely suboptimal. Each electrical trace may be etched at any of the layers of the printed circuit board, with some printed circuit boards having over 20 layers. The routing of signal traces at each layer is filled with its own multitude of design tradeoffs. Changes to the geometry of any signal trace or via can create significant changes in the efficiency of a circuit. Yet, as described, search spaces for identifying optimal circuit designs are immense such that existing systems are unable to provide solutions within reasonable time frames. Embodiments provide systems supporting an efficient design process for printed circuit boards, such as those used in chassis 100. As described in additional detail below, in some embodiments, an IHS, such as sleds 105a-n, 115a-n may be adapted for implementing a hardware architecture for optimizing the efficiency of PCB circuits utilized in the chassis. In particular, embodiments may include capabilities for a mesh control block of a PCB circuit optimization program that is operating on CPUs 170a-n to allocate portions of the calculations for a circuit simulation to mesh resources, such as replaceable GPUs 185a-n, 190a-n, thus supporting parallel computation of PCB circuit design optimizations.

Figure 2:
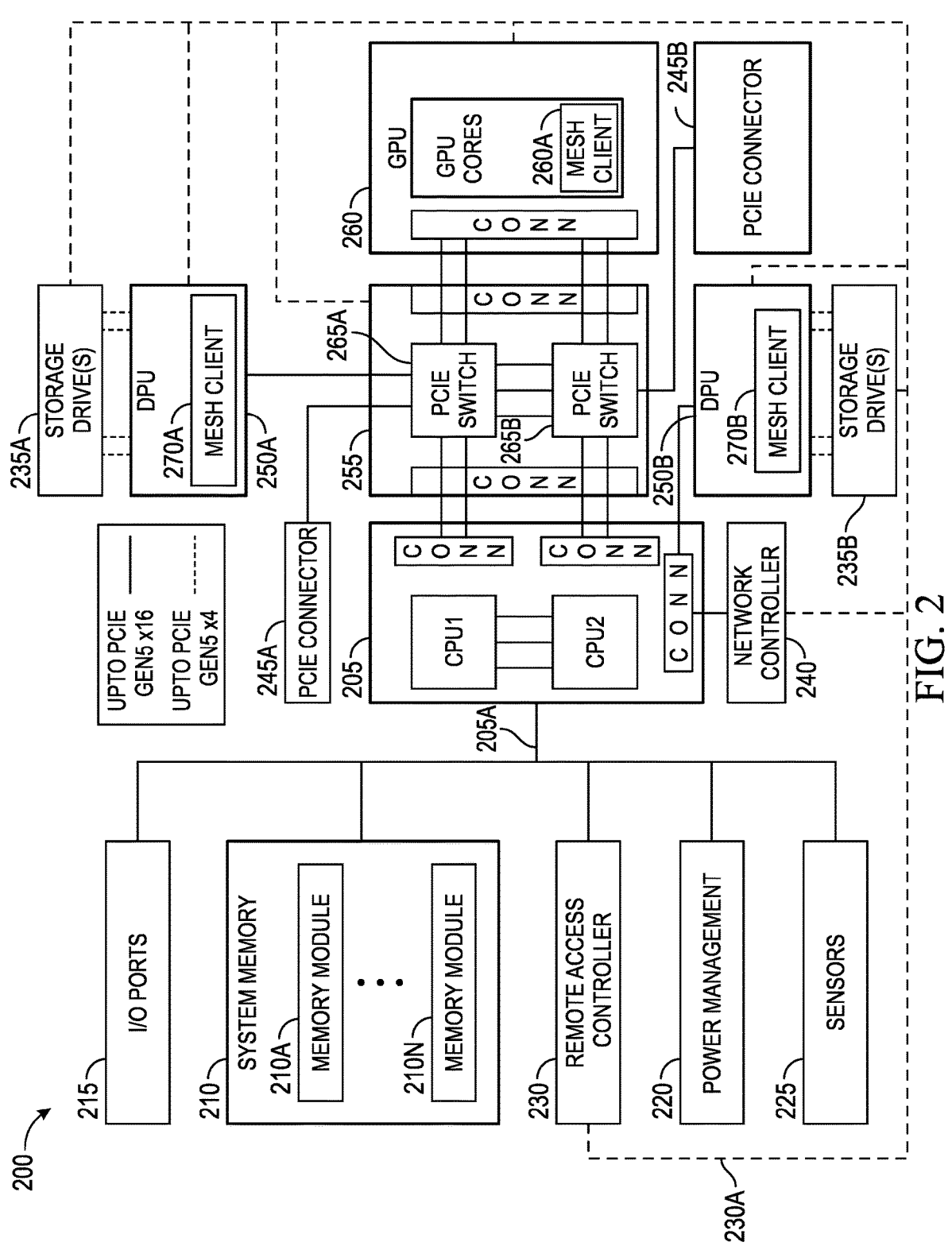
FIG. 2 is a diagram illustrating certain components of an IHS configured, according to some embodiments, for implementing a hardware architecture for optimizing PCB circuits utilized in the IHS.

In certain embodiments, each individual sled 105a-n, 115a-n-n may be an IHS such as described with regard to IHS 200 of FIG. 2. In addition to supporting the embodiments described herein, sleds 105a-n, 115a-n may individually or collectively provide computational processing resources that may be used to support a variety of e-commerce, multimedia, business and scientific computing applications, such as artificial intelligence systems provided via cloud computing implementations. Sleds 105a-n, 115a-n are typically configured with hardware and software that provide leading-edge computational capabilities. Accordingly, services provided using such computing capabilities are typically provided as high-availability systems that operate with minimum downtime. As described in additional detail with regard to FIG. 2, sleds 105a-n, 115a-n may be configured for general-purpose computing or may be optimized for specific computing tasks.

As illustrated, each sled 105a-n, 115a-n includes a respective remote access controller (RAC) 110a-n, 120a-n. As described in additional detail with regard to FIG. 2, remote access controller 110a-n, 120a-n provides capabilities for remote monitoring and management of a respective sled 105a-n, 115a-n. In support of these monitoring and management functions, remote access controllers 110a-n may utilize both in-band and sideband (i.e., out-of-band) communications with various components of a respective sled 105a-n and chassis 100. Remote access controllers 110a-n, 120a-n may collect various types of sensor data, such as collecting temperature sensor readings that are used in support of airflow cooling of the chassis 100 and the sleds 105a-n, 115a-n. In addition, each remote access controller 110a-n, 120a-n may implement various monitoring and administrative functions related to a respective sleds 105a-n, 115a-n that utilize sideband bus connections with various internal components of the respective sleds 105a-n, 115a-n.

As described in additional detail below, in some embodiments, remote access controllers 110*a-n*, 120*a-n* may utilize these sideband management connections in collecting resource availability from managed devices of the chassis that are resources of a mesh architecture, such as from GPUs 185*a-n*, 190*a-n*.

In addition to the data storage capabilities provided by storage sleds 115*a-n*, chassis 100 may provide access to other storage resources that may be installed components of chassis 100 and/or may be installed elsewhere within a rack housing the chassis 100, such as within a storage blade. In certain scenarios, such storage resources 155 may be accessed via a SAS expander 150 that is coupled to the backplane 160 of the chassis 100. The SAS expander 150 may support connections to a number of JBOD (Just a Bunch Of Disks) storage drives 155 that may be configured and managed individually and without implementing data redundancy across the various drives 155. The additional storage resources 155 may also be at various other locations within a datacenter in which chassis 100 is installed. Such additional storage resources 155 may also be remotely located.

As illustrated, chassis 100 also includes one or more storage sleds 115*a-n* that are coupled to the backplane 160 and installed within one or more bays of chassis 200 in a similar manner to compute sleds 105*a-n*. Each of the individual storage sleds 115*a-n* may include various different numbers and types of storage devices. As described in additional detail with regard to FIG. 2, a storage sled 115*a-n* may be an IHS 200 that includes multiple solid-state drives (SSDs) 175*a-n*, accessed through a PCIe switch 165*a-n* by a respective DPU 190*a-n* of the IHS, where use of the DPU in this manner provides low-latency and high-bandwidth access to the SSDs. Use of NVMe supported by PCIe couplings further supports high-bandwidth and low-latency use of multiple SSDs in parallel. The data storage and retrieval capabilities provided by such implementations may be harnessed by offloading storage operations to a DPU 190*a-n*, and thus without burdening the main CPU of an IHS.

As illustrated, the chassis 100 of FIG. 1 includes a network controller 140 that provides network access to the sleds 105*a-n*, 115*a-n* installed within the chassis. Network controller 140 may include various switches, adapters, controllers and couplings used to connect chassis 100 to a network, either directly or via additional networking components and connections provided via a rack in which chassis 100 is installed. Chassis 100 may similarly include a power supply unit 135 that provides the components of the chassis with various levels of DC power from an AC power source or from power delivered via a power system provided by a rack within which chassis 100 may be installed. In certain embodiments, power supply unit 135 may be implemented within a sled that may provide chassis 100 with redundant, hot-swappable power supply units.

Chassis 100 may also include various I/O controllers 140 that may support various I/O ports, such as USB ports that may be used to support keyboard and mouse inputs and/or video display capabilities. Such I/O controllers 145 may be utilized by the chassis management controller 125 to support various KVM (Keyboard, Video and Mouse) 125*a* capabilities that provide administrators with the ability to interface with the chassis 100. The chassis management controller 125 may also include a storage module 125*c* that provides capabilities for managing and configuring certain aspects of the storage devices of chassis 100, such as the storage devices provided within storage sleds 115*a-n* and within the JBOD 155.

In addition to providing support for KVM 125*a* capabilities for administering chassis 100, chassis management controller 125 may support various additional functions for sharing the infrastructure resources of chassis 100. In some scenarios, chassis management controller 125 may implement tools for managing the power 135, network bandwidth 140 and airflow cooling 130 that are available via the chassis 100. As described, the airflow cooling 130 utilized by chassis 100 may include an airflow cooling system that is provided by a rack in which the chassis 100 may be installed and managed by a cooling module 125*b* of the chassis management controller 125.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

FIG. 2 illustrates an example of an IHS 200 configured according to embodiments to implement a hardware architecture for optimizing signal integrity within PCB circuits utilized in the 200. It should be appreciated that although the embodiments described herein may describe an IHS that is a compute sled or similar computing component that may be deployed within the bays of a chassis, other embodiments may be utilized with other types of IHSs that may also support systems for optimizing signal integrity within PCB circuits. In the illustrative embodiment of FIG. 2, IHS 200 may be a computing component, such as sled 105*a-n*, 115*a-n* or other type of server, such as an 1RU server installed within a 2RU chassis, that is configured to share infrastructure resources provided within a chassis 100.

IHS 200 may utilize one or more system processors 205, that may be referred to as CPUs (central processing units). In some embodiments, CPUs 205 may each include a plurality of processing cores that may be separately assigned computing tasks. Each of the CPUs 205 may be individually designated as a main processor and as a co-processor, where such designations may be based on delegation of specific types of computational tasks to a CPU 205. In some embodiments, a co-processor may be designed as a mesh resource, as described in additional detail below with regard to GPUs 260 and DPUs 250*a-b*. In some embodiments, CPUs 205 may each include an integrated memory controller that may be implemented directly within the circuitry of each CPU 205. In some embodiments, a memory controller may be a separate integrated circuit that is located on the same die as the CPU 205. Each memory controller may be configured to manage the transfer of data to and from a system memory 210 of the IHS, in some cases using a high-speed memory interface. The system memory 210 is coupled to CPUs 205 via one or more memory buses that provide the CPUs 205 with high-speed memory used in the execution of computer program instructions by the CPUs 205. Accordingly, system memory 210 may include memory components, such as static RAM (SRAM), dynamic RAM (DRAM), NAND Flash memory, suitable for supporting high-speed memory operations by the CPUs 205. In certain embodiments, system memory 210 may combine persistent non-volatile memory and volatile memory.

In certain embodiments, the system memory 210 may be comprised of multiple removable memory modules. The system memory 210 of the illustrated embodiment includes removable memory modules 210*a-n*. Each of the removable memory modules 210*a-n* may correspond to a printed circuit board memory socket that receives a removable memory module 210*a-n*, such as a DIMM (Dual In-line Memory Module), that can be coupled to the socket and then decoupled from the socket as needed, such as to upgrade memory capabilities or to replace faulty memory modules. Other embodiments of IHS system memory 210 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 200 may utilize a chipset that may be implemented by integrated circuits that are connected to each CPU 205. All or portions of the chipset may be implemented directly within the integrated circuitry of an individual CPU 205. The chipset may provide the CPU 205 with access to a variety of resources accessible via one or more in-band buses 205*a*. IHS 200 may also include one or more I/O ports 215 that may be used to couple the IHS 200 directly to other IHSs, storage resources, diagnostic tools, and/or other peripheral components. A variety of additional components may be coupled to CPUs 205 via a variety of busses. For instance, CPUs 205 may also be coupled to a power management unit 220 that may interface with a power system of the chassis 100 in which IHS 200 may be installed. CPUs 205 may collect information from one or more sensors 225 via a management bus.

In certain embodiments, IHS 200 may operate using a BIOS (Basic Input/Output System) that may be stored in a non-volatile memory accessible by the CPUs 205. The BIOS may provide an abstraction layer by which the operating system of the IHS 200 interfaces with hardware components of the IHS. Upon powering or restarting IHS 200, CPUs 205 may utilize BIOS instructions to initialize and test hardware components coupled to the IHS, including both components permanently installed as components of the motherboard of IHS 200 and removable components installed within various expansion slots supported by the IHS 200. The BIOS instructions may also load an operating system for execution by CPUs 205. In certain embodiments, IHS 200 may utilize Unified Extensible Firmware Interface (UEFI) in addition to or instead of a BIOS. In certain embodiments, the functions provided by a BIOS may be implemented, in full or in part, by the remote access controller 230.

In some embodiments, IHS 200 may include a TPM (Trusted Platform Module) that may include various registers, such as platform configuration registers, and a secure storage, such as an NVRAM (Non-Volatile Random-Access Memory). The TPM may also include a cryptographic processor that supports various cryptographic capabilities. In IHS embodiments that include a TPM, a pre-boot process implemented by the TPM may utilize its cryptographic capabilities to calculate hash values that are based on software and/or firmware instructions utilized by certain core components of IHS, such as the BIOS and boot loader of IHS 200. These calculated hash values may then be compared against reference hash values that were previously stored in a secure non-volatile memory of the IHS, such as during factory provisioning of IHS 200. In this manner, a TPM may establish a root of trust that includes core components of IHS 200 that are validated as operating using instructions that originate from a trusted source.

As described, IHS 200 may include a remote access controller 230 that supports remote management of IHS 200 and of various internal components of IHS 200. In certain embodiments, remote access controller 230 may operate from a different power plane from the CPUs 205 and from other components of IHS 200, thus allowing the remote access controller 230 to operate, and management tasks to proceed, while the processing cores of IHS 200 are powered off. As described, various functions provided by the BIOS, including launching the operating system of the IHS 200, may be implemented by the remote access controller 230. In some embodiments, the remote access controller 230 may perform various functions to verify the integrity of the IHS 200 and its hardware components prior to initialization of the operating system of IHS 200 (i.e., in a bare-metal state).

Remote access controller 230 may include a service processor, or specialized microcontroller, that operates management software that provides remote monitoring and administration of IHS 200. Remote access controller 230 may be installed on the motherboard, backplane, midplane, etc. of IHS 200, or may be coupled to IHS 200 via an expansion slot connector provided the IHS. In support of remote monitoring functions, remote access controller 230 may include a dedicated network adapter that may support management connections by remote access controller 230 using wired and/or wireless network technologies. As a non-limiting example of a remote access controller, the integrated Dell Remote Access Controller (iDRAC) from Dell® is embedded within Dell PowerEdge™ servers and provides functionality that helps information technology (IT) administrators deploy, update, monitor, and maintain servers remotely.

In some embodiments, remote access controller 230 may support collection of resource availability and resource utilization data from managed devices of the IHS that are mesh resources, such as GPUs 260 and DPUs 270*a-b*, where this data may be collected via a sideband bus interface 230*a*. For instance, messages transmitting resource availability and utilization data may be transmitted using I2C sideband bus 230*a* connections that may be established with each of the managed devices. These managed devices of IHS 200, such as replaceable GPUs 260 and replaceable DPUs 270*a-b*, may be connected to the CPUs 205 via in-line buses, such as a PCIe switch fabric, that is separate from the I2C sideband bus 230*a* connections used by the remote access controller 230 for supporting device management.

As illustrated, CPUs 205 may be coupled to a network controller 240, such as provided by a Network Interface Controller (NIC) card that provides IHS 200 with communications via one or more external networks, such as the Internet, a LAN, or a WAN. In some embodiments, network controller 240 may be a replaceable expansion card or adapter that is coupled to a connector (e.g., connection of a motherboard, backplane, midplane, etc.) of IHS 200. In some embodiments, network controller 240 may support high-bandwidth network operations through a PCIe coupling accessible by the chipsets of CPUs 205.

As indicated in FIG. 2, in some embodiments, CPUs 205 may be coupled to a PCIe card 255 that includes two PCIe switches 265*a-b* that operate as I/O controllers for PCIe communications, such as TLPs (Transaction Layer Packets), that are transmitted between the CPUs 205 and PCIe devices and systems coupled to IHS 200. Whereas the illustrated embodiment of FIG. 2 includes two CPUs 205 and two PCIe switches 265*a-b*, different embodiments may operate using different numbers of CPUs and PCIe switches. In addition to serving as I/O controllers that route PCIe traffic, PCIe switches 265*a-b* include switching logic that can be used to expand the number of PCIe connections that are supported by CPUs 205.

PCIe switches 265*a-b* may multiply the number of PCIe lanes available to CPUs 205, thus allowing more PCIe devices to be connected to CPUs 205, and for the available PCIe bandwidth to be allocated with greater granularity. In some instances, the switching logic of PCIe switches 265*a-b* that is used to route PCIe transmissions are connected to CPUs 205 via upstream ports and are connected to PCIe devices via downstream ports that multiply the number of upstream ports, thus distributing the available PCIe bandwidth of the upstream ports to the downstream ports.

As illustrated, PCIe switch 265*a* is coupled via PCIe connections to a DPU 250*a* that may be a connected to the IHS via a removeable card that couples to a PCIe connector of the IHS. Also as illustrated, rather than utilize a PCIe switch, DPU 250*b* is coupled via a PCIe connection directly to CPUs 205. PCIe switch 265*b* may also be connected to the IHS via a removeable card that couples to a PCIe connector of the IHS. Each of the replaceable DPUs 250*a-b* includes a programmable processor that can be configured for offloading functions from CPUs 205. In some instances, DPUs 250*a-b* may be programmed to offload functions that support the operation of devices or systems that are coupled to IHS 200, thus sparing CPUs 205 from a significant number of interrupts required to support these devices coupled to the IHS and gaining efficiency through the use of specialized implementations of these offloaded functions that can be achieved using the programmable logic of the DPUs 250*a-b*.

In some embodiments, DPUs 250*a-b* may include a plurality of programmable processing cores and/or hardware accelerators, that may be used to implement functions used to support devices coupled to the IHS 200. DPUs 250*a-b* may also include one more memory devices that may be used to store program instructions executed by the processing cores and/or used to support the operation of SSD storage drives 235*a-b*, such as in implementing cache memories and buffers utilized in support of the storage drives. In some embodiments, the processing cores of DPUs 250*a-b* include ARM (advanced RISC (reduced instruction set computing) machine) processing cores. In other embodiments, the cores of DPUs 250*a-b* may include MIPS (microprocessor without interlocked pipeline stages) cores, RISC-V cores, or CISC (complex instruction set computing) (i.e., x86) cores.

In some embodiments, DPUs 250*a-b* may be implemented through integrated circuits mounted on a printed circuit board (e.g., a replaceable card) that is coupled, in a replaceable manner, to the motherboard, backplane, midplane or other printed circuit board of the IHS. In some embodiments, PCIe busses may be utilized both in the couplings connecting DPUs 250*a-b* to the IHS 200 and in the couplings connecting the DPUs 250*a-b* to the SSD storage drives 235*a-b*. In other embodiments, DPUs 250*a-b* may implement operations in support of other types of devices and may similarly support high-bandwidth PCIe connections with these devices. For instance, in various embodiments, DPUs 250*a-b* may support high-bandwidth connections, such as PCIe connections, with networking devices in implementing functions of a network switch, compression and codec functions, virtualization operations or cryptographic functions.

As indicated in FIG. 2, DPUs 250*a-b* are each configurated to operate a separate instanced of a mesh client 270*a-b* program. As describe in further detail below, the mesh client program 270*a-b* implemented by the DPUs 250*a-b* is configured to identify and reserve mesh resource of DPUs 250*a-b* for use by a mesh control block program that operates on one or more CPU 205 of the IHS. In some embodiments, each mesh client 270*a-b* may be invoked upon initialization of the mesh control block program that operates on CPU 205. In some embodiments, each of the DPUs 250*a-b* may include a single respective mesh client 270*a-b*. In some embodiments, a DPU 250*a-b* may operate multiple mesh clients, such as embodiments that operate separate mesh client programs on different ARM cores of a respective DPU, thus further parallelizing the PCB optimization calculations.

As described in additional detail, each of the mesh clients 270*a-b* supported by DPUs 250*a-b* may be allocated portions of the calculations of a PCB circuit optimization by the mesh control block program that operates on CPU 205. Through parallel allocations of calculations to the mesh clients 270*a-b* in this manner, convergence times for PCB circuit optimizations are significantly improved over conventional circuit design systems. In addition, based on mesh resource availability in the IHS 200, such as the number of ARM cores of a DPU that are available for use as mesh resources, different amounts of processing may be offloaded to DPUs 250*a-b*, thus supporting different levels of fidelity in the PCB circuit optimizations.

Also as described below, embodiments may configure mesh clients 270*a-b* for use in a PCB circuit optimization based on transmission of an optimization manifest by the mesh control block program that operates on CPU 205. The manifest is used to specify the DPU, GPU or other removeable processor resources that have been tasked for use in offloaded PCB circuit optimization calculations. Using the resources specified in the manifest, the mesh client 270*a-b* computes the offloaded PCB circuit optimization calculation and generates a log specifying the DPU resources that were actually used in performing the calculations. Upon completing the offloaded calculation, the mesh client 270*a-b* transmits the result of the calculation and this log to the mesh control block program that operates on CPU 205. The mesh control block utilizes the results to further complete the PCB circuit optimization that is currently underway. Additionally, based on the log information, the mesh control block operating on CPU 205 determines whether additional resources are available and can be allocated as mesh resources that can be used in the ongoing PCB circuit optimization.

As resource availability changes in DPUs 270*a-b*, such as a reduction in available resources due to the need to support higher priority operations, DPUs 270*a-b* may transmit updated resource availability to the mesh control block program that operates on a CPU 205, where the updated resource availability information is incorporated into an updated manifest. In some embodiments, the reports of resource availability and resource utilization by mesh resources, such as GPUs 260 and DPUs 270a-b, may be transmitted between the mesh clients 270a-b, 260a and the mesh control block program that operates on a CPU 205 via transmissions supported by remote access controller 230a using sideband signaling pathways 230a with the mesh resources.

In addition to supporting high-bandwidth PCIe couplings with CPUs 205, as illustrated in FIG. 2, PCIe switches 265a-b may also support PCIe couplings with one or more replaceable GPUs (Graphics Processing Units) 260. Embodiments may include one or more replaceable GPU cards, where each GPU card is coupled to one or more of the PCIe switches 265a-b, and where each GPU card may include one or more GPUs 260. Accordingly, GPUs 260 may include on or more hardware-accelerated processing cores that are optimized for performing streaming calculation of vector data, matrix data and/or other graphics data, thus supporting the rendering of graphics for display on devices coupled either directly or indirectly to IHS 200.

Additionally or alternatively to being used for rendering graphics data for display or otherwise processing of graphics data, in some embodiments, GPUs 260 may be used as mesh resources. In the same manner as the mesh clients 270a-b that operate on DPUs 250a-b, a mesh client 260a may be operated by GPUs 260. Mesh client 260a may be initiated upon initialization of the mesh control block program that operates on CPU 205. In some embodiments, each of the GPUs 260 may include a single respective mesh client 260a. In some embodiments, an individual GPU 260 may operate multiple mesh clients, such as operating separate mesh client programs on each different processor core of a GPU. As above, each mesh client 260a supported by GPUs 260 may be allocated portions of PCB circuit optimization calculations by the mesh control block program that operates on CPU 205. Based on mesh resource availability in the IHS 200, such as the number of GPUs 260 processor cores that are available for use as mesh resources, different levels of fidelity may be supported in the PCB circuit optimizations. As with the mesh clients 270a-b operating on DPUs 250a-b, embodiments may configure mesh clients 260a of GPUs 260 for use in a PCB circuit optimization through distribution of an optimization manifest created by the mesh control block program that operates on CPU 205. Using the resources specified in the manifest, the mesh client 260a computes offloaded PCB circuit optimization calculations and generates a log specifying the GPU 260 resources that were actually used in performing the calculations. Upon completing the offloaded calculation, the mesh client 260a transmits the result of the calculation and this log to the mesh control block program that operates on CPU 205.

As illustrated in FIG. 2, PCIe switches 265a-b may support PCIe connections in addition to those utilized by GPUs 260 and DPUs 250a-b, where these connections may include PCIe links of one or more lanes. For instance, PCIe connectors 245a-b supported by printed circuit board of IHS 200 may allow various other systems and devices to be coupled to IHS. Through couplings to PCIe connectors 245a-b, a variety of data storage devices, graphics processors and network interface cards may be coupled to IHS 200.

In various embodiments, an IHS 200 does not include each of the components shown in FIG. 2. In various embodiments, an IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 205 as a systems-on-a-chip.

Figure 3:
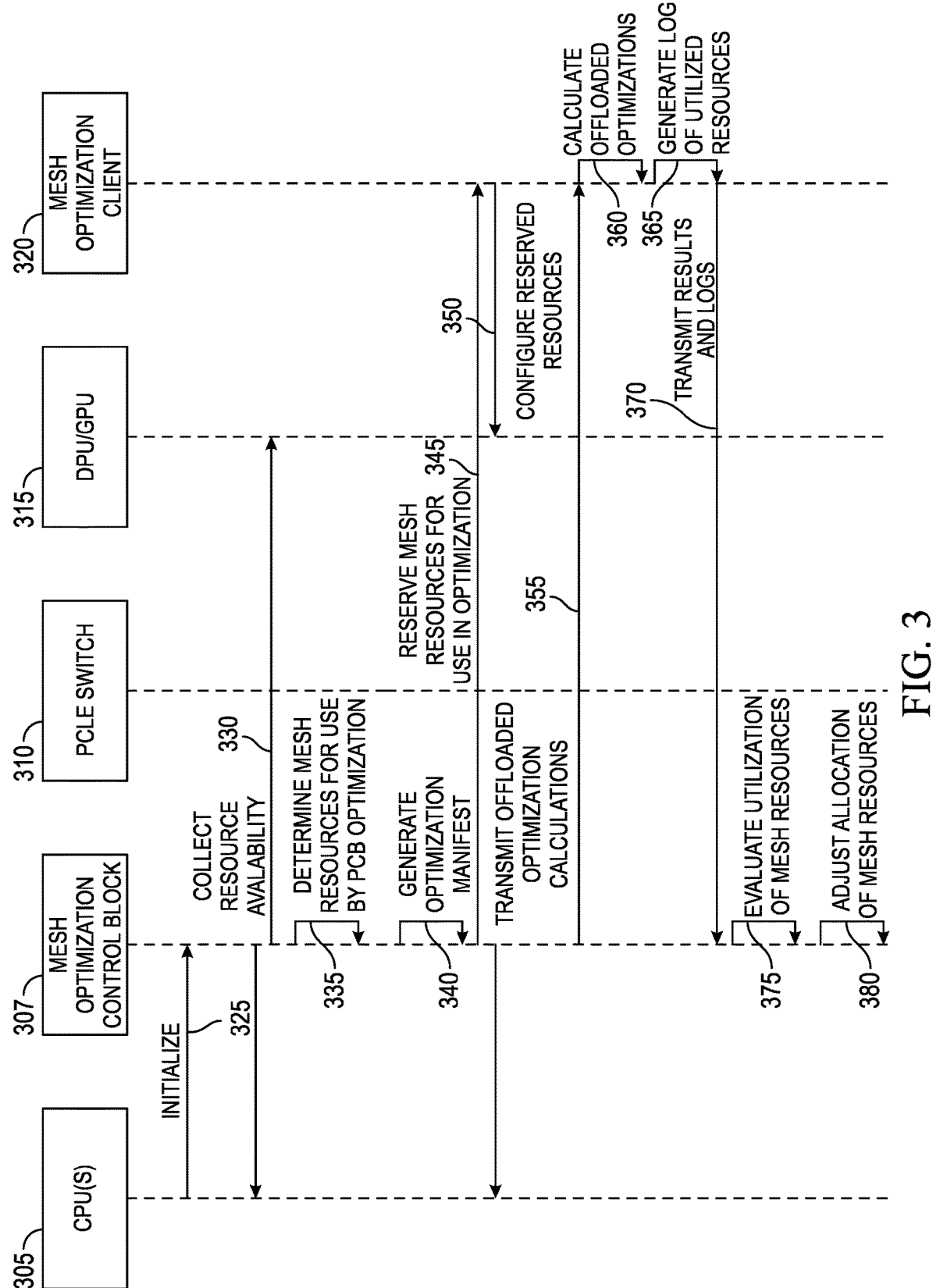
FIG. 3 is a swim lane diagram illustrating certain responsibilities of components of a hardware architecture of an IHS configured according to certain embodiments for optimizing PCB circuits utilized in IHSs.

FIG. 3 is a swim lane diagram illustrating certain responsibilities of components of a system configured according to certain embodiments for implementing a hardware architecture for use in optimizing PCB circuits utilized in an IHS. As described with regard to FIG. 2, embodiments may include an IHS that includes one or more CPUs 305, mesh optimization control block 307, PCIe switches 310, and DPUs/GPUS 315, which each implement a mesh optimization client 320. FIG. 4 is a flowchart describing certain steps of a method, according to some embodiments, for utilizing the described hardware architecture in order to optimize signaling characteristics within PCB circuits utilized in an IHS.

Some embodiments of the method of FIG. 4 may begin, at block 405, with the initialization 325 of a mesh optimization control block 307 program by CPU 305. As described with regard to FIG. 2, an IHS may utilize one or more CPUs for use in operating software programs. Accordingly, one or more of the CPUs 305 of the IHS may be used to operate a mesh optimization control block 307 that includes PCB circuit optimization capabilities, including the ability to perform PCB circuit optimization calculations itself and also to offload a portion of the PCB circuit optimization calculations to mesh clients 320 that are available for use within the IHS.

Upon initialization of the mesh control block 307, at 410, mesh resource availability information is collected. As indicated at FIG. 3, at 330, the mesh control block 307 may collect resource availability information from CPUs 305 and/or DPUs/GPUs 315, which have been designated as providing mesh resources for assignment by the mesh control block. In some embodiments, prior to determining resource availability, the mesh control block 307 initiate a mesh optimization client 320 on all DPUs/GPUs 315 that have been designated as providing mesh resources for assignment by the mesh control block. In such instances, upon its respective instantiation, each individual mesh optimization client 320 may determine local resource availability of a host DPU/GPU 315. As described above, each DPU/GPU 315 may include programmable logic components, such as one or more ARM cores, and memory devices capable of storing program instructions and data for used by the logic components. Utilizing these capabilities of DPU/GPU 315, the mesh optimization client 320 may be implemented using program instructions that are stored in these memory devices of DPUs/GPUs 315 and that are executed using the programmable processing cores, such as an ARM core.

In some embodiments, the resource availability collected from DPUs/GPUs 315 may specify the number of processing cores that are available for assignment as mesh resources. For instance, the resource availability of a DPU may specify that three out of four total ARM cores of the DPU are available for assignment by the mesh control block 307. In some embodiments, the resource availability of DPUs/GPUs 315 may specify a share of each available processor (e.g., 50% of the processing cycles of an ARM core of a DPU) that is available for assignment by the mesh control block 307. In some embodiments, the resource availability of DPUs/GPUs 315 may specify an amount of memory that can be allocated for exclusive assignment by the mesh control block 307. As described above, in some embodiments, such resource availability information (and updates to this availability information) may be collected by a remote access controller that utilizes sideband device management capabilities to obtain resource availability information from managed DPUs/GPUs 315.

Based on the collected resource availability information, at 335, the mesh control block 307 determines a portion of the available mesh resources that will be used in an initial iteration of a PCB circuit optimization program. In some instances, the mesh control block 307 will include all available mesh resources for use in offloading portions of the PCB circuit optimization calculations. In other instances, the mesh control block 307 will initially utilize only a portion of the available mesh resources for offloading calculations. Through initial use of only a portion of available resources, the mesh control block 307 can ensure that only resources that are actually being used in the PCB circuit optimization remain designated as mesh resources that are reserved for use by the mesh control block. As described below, successive iterations of the PCB circuit optimization can increase the portion of available mesh resources that are allocated for use in the PCB circuit optimization, thus allowing the amount of reserved mesh resources to be calibrated to the actual availability of these mesh resources.

Once the mesh control block 307 determines the available mesh resources that will be assigned for use in the PCB circuit optimization, at 340 and 415, the mesh control block 307 generates an optimization manifest specifying these resource assignments. The optimization manifest may be a file or data structure that specifies the mesh optimization clients 320 that are participating in the PCB circuit optimization and the allocated resources of the DPUs/GPUs 315 that are reserved for use by each of the mesh clients 320 in performing offloaded calculations. At 345 and 415, this manifest is distributed by the mesh control block 307 to each mesh optimization client 320 that has been initialized and that has reported resource availability for assignment by the mesh optimization control block 307. As indicated in FIG. 3, upon receipt of the manifest, the mesh control block 307 configures the reserved resources, where these configurations may adapt the capabilities of the DPUs/GPUs 315 for performing offloaded PCB circuit optimization calculations. For instance, programmable cores of DPUs/GPUs 315 may be configured for PCB circuit optimization calculations, such as the programming of impedance calculations used in the optimization into the configurable logic of these cores. In addition, data sets and other information used in the calculations may be preloaded to reserved areas of memory of the DPUs/GPUs 315.

Upon distribution of the optimization manifest to the mesh clients 320, at 420, the mesh control block 307 generations an optimization mesh for use in performing the PCB circuit optimization. The optimization mesh tracks the mesh clients 320 that are participating in the optimization and the portions of the PCB circuit optimization that have been offloaded to each of the respective mesh clients 320. The optimization mesh may be used by the mesh control block 307 to track the progress of offloaded calculations and to identify mesh clients 320 that are generating responses more quickly or more slowly than other mesh clients 320, thus allowing the mesh control block 307 to reallocate the offloaded optimization calculations towards the use of better performing mesh clients 320. With the mesh generated and the mesh clients 320 configured, at 355, the mesh control block 307 offloads portions of a PCB circuit optimization to the individual mesh clients 320.

In some embodiments, the offloaded PCB circuit optimization calculations may be impedance calculations for a specific circuit geometry, or for a combination of circuit geometries. These impedance calculations may be repeated for a range of frequencies, clock speeds, transmission speeds and/or ambient temperatures. Accordingly, some or all of these calculations may be offloaded by the mesh control block 307 for parallel computation. By utilizing the mesh clients 320 in parallel, the mesh control block 307 reduces the time required to reach an optimized PCB circuit design. For instance, impedance calculations for operations at different frequencies may be offloaded to different mesh clients 320, thus allowing these impedance calculations to be completed in parallel. In some embodiments, the mesh control block 307 may adjust the fidelity of the PCB circuit optimization based on the number mesh clients 320 that are available for assignment. The greater the number of mesh clients 320 the greater fidelity of frequency calculations that may be assigned by the mesh control block 307 to the available mesh clients 320. For instance, with a small number of mesh clients 320 available, impedance calculations may be repeated at every 100 MHz within a certain frequency range, but with a large number of mesh clients 320 available, impedance calculations may be repeated at every 50 MHz within that frequency range, thus improving the fidelity of the PCB circuit optimization.

Upon the transmission of the offloaded PCB optimization calculations, at 360 and 425, the mesh clients 320 perform the offloaded calculations using the DPU/GPU 315 resources that were reserved based on the manifest for exclusive use by the mesh clients 320. In some instances, the offloaded calculations may be a set of impedance calculations for portion of a circuit over a range of frequencies, such as impedance calculations for a circuit that are repeated at ten different frequencies. In this example, the mesh clients 320 use the reserved and configured DPUs/GPUs 315 resources, such as one or more programmable cores, to perform the impedance calculations and to generate a set of results.

As indicated in FIG. 3, the mesh optimization client 320 tracks the resources of the DPUs/GPUs 315 that are actually utilized in completing the offloaded calculations. For instance, for each processor core of DPUs/GPUs 315 that is a participating in the mesh, the mesh optimization client 320 may track the percentage of reserved cycles of the processor core that were used in the calculation of offloaded optimization calculations. Similarly, the mesh clients 320 may track the percentage of reserved DPU/GPU 315 memory that was actually used in performing the offloaded calculations. At 365, the mesh optimization client 320 generates a log that specifies the actual DPU/GPU 315 resource utilizations during the most recent period of offloaded calculations.

At 370, the mesh optimization client 320 transmits the results of the calculation and the log to the mesh control block 307. The results received by the mesh control block 307 are incorporated into the ongoing PCB circuit optimization. At 430 and 375, the mesh control block 307 evaluates the logs in order to identify improvements in the allocation of offloaded calculations to the mesh clients 320. In tracking the resource utilization and availability by the individual mesh clients 320, at 435, the mesh control block 307 may maintain a heat map of mesh resource utilization which identifies resources that are heavily used with each iteration and resources that are being consistently underutilized. In some embodiments, the heat map may be extension of the manifest the specifies the allocated mesh resources.

Based on the heat map, at 440 and 380, the mesh control block 307 may adjust the allocation of mesh resources for used in the PCB circuit optimization. For instance, in light of log data showing that all DPU/GPU 315 processor cores are fully utilized, the mesh control block 307 may allocate additional processing resources that are available, but were not included in the prior iteration of the optimization, such as adding use of a GPU as a mesh resource when all DPUs are already being used as mesh resources and are being maximally utilized. In the same manner, any allocated processing and/or memory resources of DPU/GPU 315 that are not being fully utilized may be relinquished by the mesh control block 307, thus freeing these assets for other uses. Through use of the heat map, the mesh control block 307 may identity mesh resources that cannot be feasibly tasked with any additional offloaded calculations and may also identify mesh resources that can handle additional offloading.

If evaluation of the logs does not provide any basis for adjusting the resource utilization, as indicated in FIG. 4, the mesh control block 307 returns to 425 to continue the PCB circuit optimization. Since no changes are made to the utilization of the mesh resources, the previously distributed simulation manifest remains operative in specifying the mesh resources for use in the next iteration of the optimization. In scenarios where changes to resource utilization are warranted, at 445, the manifest is updated with the modified resource utilization, such as allocating use of an additional processor core that has become available for use in the optimization. As indicated in FIG. 4, processing returns to 415, where the updated manifest is distributed to the mesh clients 320. Using the resources specified in the updated manifest, the mesh control block 307 continues with additional iterations of the PCB circuit optimization. In the manner, embodiments support parallel computation of circuit optimizations using mesh resources, where the mesh resources reserved for use in the optimizations is adjusted through the optimization based on availability of resources and observed actual resource utilization.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS) that comprises:
   one or more central processors;
   one or more first memory devices that comprise stored computer-readable instructions that, upon execution by the one or more central processors, cause a mesh control block program to:
      determine availability of mesh resources that comprise resources of a first removeable processor;
      reserve available mesh resources that comprise a plurality of available processor cores of the first removeable processor;
      assign a plurality of portions of a circuit optimization to be executed in parallel by a respective plurality of reserved processor cores of the first removeable processor;
      collect results determined by the first removeable processor based at least in part on parallel execution of the plurality of portions of the circuit optimization;
      collect a log that indicates utilization levels of reserved mesh resources of the first removeable processor in determination of the results; and
      evaluate the log to determine updates to the mesh resources that are available to be reserved for further use in the circuit optimization; and
   at least one removeable processor that comprises:
      a plurality of processor cores; and
      one or more second memory devices that comprise stored computer-readable instructions that, upon execution by reserved processor cores of the plurality of processor cores, cause a mesh client program to:
         determine the results at least in part by parallel execution of the plurality of portions of the circuit optimization assigned to the respective plurality of reserved processor cores by the mesh control block program;
         track use of removeable processor resources while the results are determined; and
         transmit, to the mesh control block program, the results and the log.

2. The IHS of claim 1, where execution of the instructions by the one or more central processors further causes the mesh control block program to generate a manifest that specifies the available mesh resources of the first removeable processor to be reserved for use in the circuit optimization.

3. The IHS of claim 2, where execution of the instructions by the one or more central processors further causes the mesh control block program to transmit to the first removeable processor, the manifest that specifies the mesh resources of the first removeable processor to be reserved for use in the circuit optimization.

4. The IHS of claim 3, where execution of the instructions by the reserved processor cores of the plurality of processor cores further causes the mesh client program to allocate the mesh resources of the first removeable processor specified in the manifest for exclusive use by the mesh client program.

5. The IHS of claim 1, wherein the at least one removeable processor further comprises at least one of a Graphics Processing Unit (GPU) or a Data Processing Unit (DPU).

6. The IHS of claim 1, where execution of the instructions by the reserved processor cores of the plurality of processor cores further causes the mesh client program to update the availability of the mesh resources of the first removeable processor that are available for assignment by the mesh control block program.

7. The IHS of claim 1, wherein the circuit optimization comprises a plurality of impedance calculations.

8. The IHS of claim 7, wherein the plurality of portions of the circuit optimization assigned to the first removeable processor comprise one or more of the plurality of impedance calculations for a first set of frequencies.

9. The IHS of claim 8, wherein the plurality of portions of the circuit optimization assigned to a second removeable processor comprise calculation of one or more of the plurality of impedance calculations for a second set of frequencies.

10. The IHS of claim 9, wherein assignment of the calculation of impedance calculations at the second set of frequencies increases fidelity of the circuit optimization.

11. The IHS of claim 1, wherein the IHS further comprises a remote access controller configured to collect information that indicates the availability of the mesh resources.

12. The IHS of claim 11, wherein information that indicates the availability of the mesh resources is collected at least in part via a sideband management connection between the remote access controller and the mesh resources.

13. A method comprising:

determining, by a mesh control block operated by a central processor of an Information Handling System (IHS), availability of one or more mesh resources, wherein available mesh resources comprise a plurality of processor cores of a first removeable processor;

reserving, by the mesh control block, available mesh resources of the first removeable processor for use in a circuit optimization;

assigning, by the mesh control block, a plurality of portions of the circuit optimization to be executed in parallel by the first removeable processor using a respective plurality of reserved processor cores;

determining, by a mesh client operated by the first removeable processor, results of the circuit optimization, at least in part by executing the plurality of portions of the circuit optimization in parallel using the respective plurality of reserved processor cores;

tracking, by the mesh client, use of mesh resources of the first removeable processor during the determination of the results;

collecting, by the mesh control block, a log indicating utilization levels of the reserved mesh resources of the first removeable processor used in determining the results;

transmitting, by the mesh client to the mesh control block, the results and the log; and evaluating, by the mesh control block, the log to determine updates to the mesh resources that are available to be reserved for further use in the circuit optimization.

14. The method of claim 13, wherein the method further comprises determining available mesh resources of a plurality of removeable processors that each comprise at least one of a Graphics Processing Unit (GPU) or a Data Processing Unit (DPU).

15. The method of claim 13, further comprising updating, by the mesh client, the availability of the mesh resources of the first removeable processor that are available for assignment by the mesh control block.

16. The method of claim 13, wherein the circuit optimization further comprises a plurality of impedance calculations.

17. The method of claim 16, wherein the plurality of portions of the circuit optimization assigned to the first removeable processor further comprise one or more of the plurality of impedance calculations for a first set of frequencies.

18. A system that comprises:

one or more central processors coupled to one or more first memory devices that comprise stored computer-readable instructions that, upon execution by the one or more central processors, cause a mesh control block program to:

determine availability of one or more mesh resources, wherein available mesh resources comprise a plurality of processor cores of a first removeable processor of a plurality of removeable processors;

reserve available mesh resources of the first removeable processor for use in a circuit optimization;

assign a plurality of portions of the circuit optimization to be executed in parallel by the first removeable processor on a respective plurality of reserved processor cores;

determine results based at least in part upon parallel execution of the assigned plurality of portions of the circuit optimization by the respective plurality of reserved processor cores of the first removable processor;

collect a log that indicates utilization levels of the reserved mesh resources in determination of the results; and evaluate the log to determine updates to the mesh resources that are available to be reserved for further use in the circuit optimization; and the plurality of removeable processors, each comprising a plurality of processor cores and one or more second memory devices that comprise stored computer-readable instructions that, upon execution by the plurality of reserved processor cores, cause a mesh client program to:

determine the results by parallel execution of the plurality of portions of the circuit optimization by the respective plurality of reserved processor cores;

track use of reserved mesh resources of the first removeable processor in determination of the results; and transmit, to the mesh control block, the results and the log.

19. The system of claim 18, wherein at least one of the plurality of removeable processors further comprise at least one of a Graphics Processing Unit (GPU) or a Data Processing Unit (DPU).

20. The system of claim 18, wherein the circuit optimization further comprises a plurality of impedance calculations.

* * * * *